(No Model.) 2 Sheets—Sheet 2.

F. STRUB & W. NENDEL.
HAY LOADER.

No. 379,341. Patented Mar. 13, 1888.

Witnesses
Geo. Thorpe.
J. C. O. Garner

Inventors
Frank Strub and
William Nendel
by C. A. Snow & Co.
Attorneys.

UNITED STATES PATENT OFFICE.

FRANK STRUB AND WILLIAM NENDEL, OF LEMARS, IOWA.

HAY-LOADER.

SPECIFICATION forming part of Letters Patent No. 379,341, dated March 13, 1888.

Application filed August 16, 1887. Serial No. 247,091. (No model.)

*To all whom it may concern:*

Be it known that we, FRANK STRUB and WILLIAM NENDEL, citizens of the United States, residing at Lemars, in the county of Plymouth and State of Iowa, have invented a new and useful Improvement in Hay Rakes and Loaders, of which the following is a specification.

Our invention relates to an improvement in hay rakes and loaders; and it consists in the peculiar construction and combination of devices, that will be more fully set forth hereinafter, and particularly pointed out in the claims.

Figure 1:
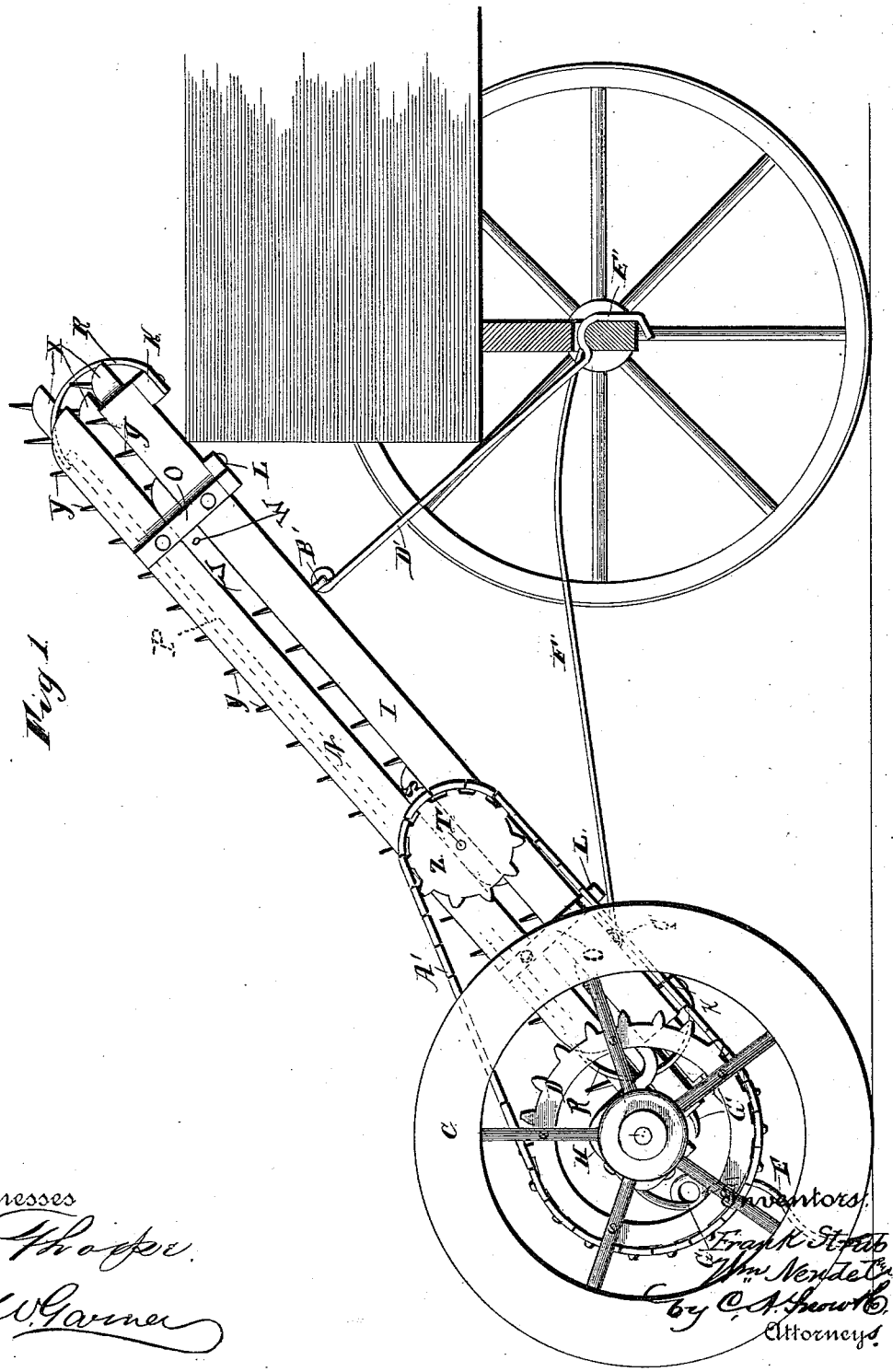
Figure 2:
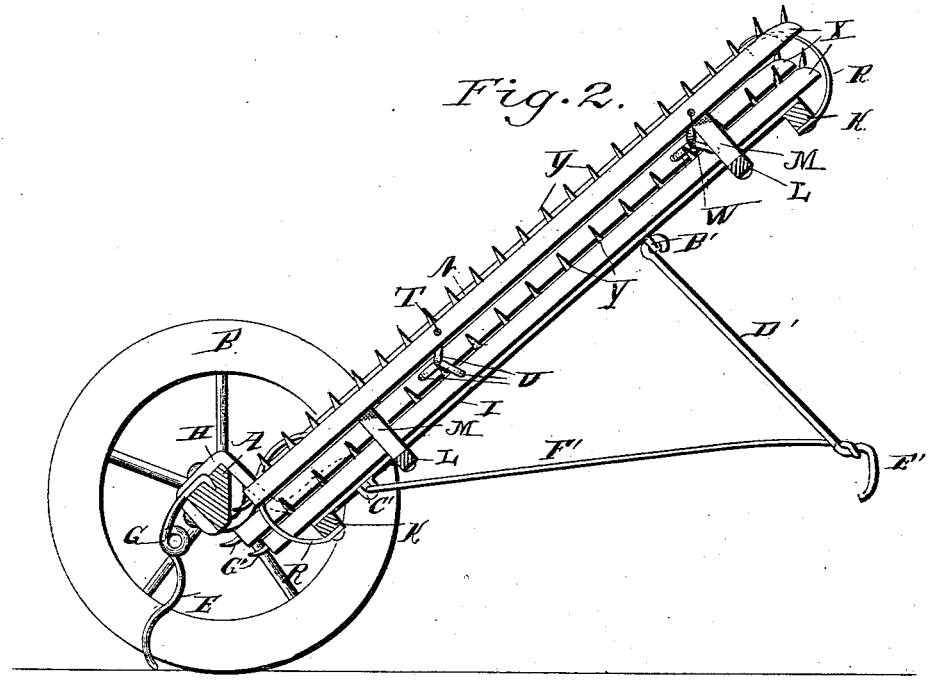
Figure 3:
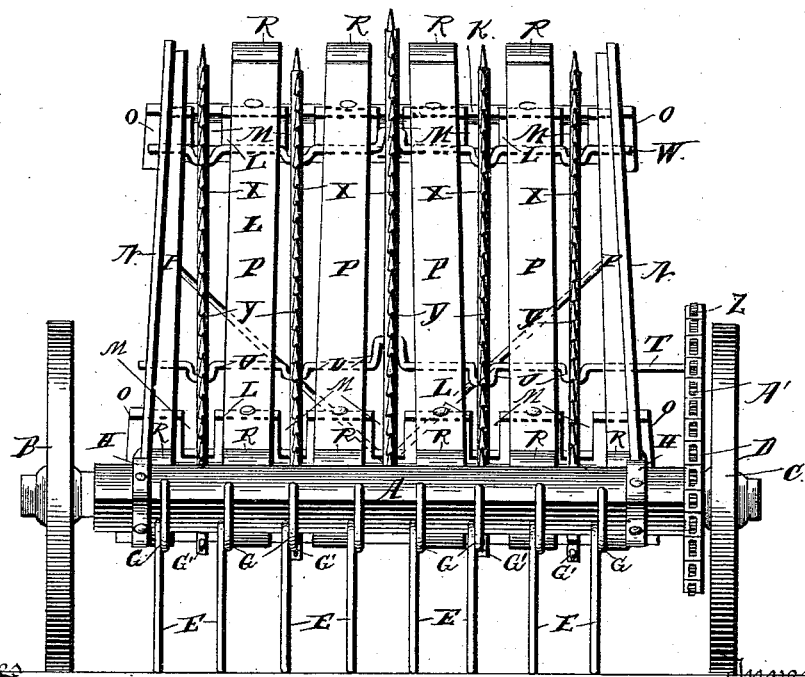

In the accompanying drawings, Figure 1 is a side elevation of a hay rake and loader embodying our improvements. Fig. 2 is a vertical longitudinal sectional view of the same. Fig. 3 is a rear elevation of the same.

A represents the axle, on the ends of which are journaled wheels B C. Rigidly attached to the inner side of the wheel C is a large sprocket-wheel, D.

E represents a series of rake-teeth, each of which is bent from a single piece of spring-bar metal and fashioned as shown, the upper end of each tooth being rigidly attached to the axle, and each tooth being provided with a spring-coil, G, whereby it is adapted to yield when it encounters an inflexible obstruction.
Near the ends of the axle are secured metallic arms H, which extend upward and forward from the same, and the said arms are bolted to the top edges of the lower ends of a pair of side bars, I. The said side bars are connected at their extremities, on their under sides, by means of cross-bars K, said bars I and K forming a supporting-frame.

L represents a pair of transverse guide-bars, the ends of which are secured to the under sides of the side bars I at suitable distances from the extremities of the latter. The upper sides of the guide-bars L project upward above the upper edges of the bars I, and are provided with open guide-slots M, into which the tooth-bars X necessarily sink when the same are in operation, as hereinafter described.

N represents a pair of side bars which are supported above the side bars I by standards O, which project from the outer sides of the side bars.

P represents a series of platform-slats, which are arranged lengthwise between the side boards at suitable regular distances apart, and are bolted to the upper sides of the guide-bars L on the integral portions of the said bars between the open slots M thereof.

R represents curved guard-plates, which are semicircular in form and have their opposite ends secured, respectively, to the upper sides of the platform-slats P and the lower sides of the cross-bars K. These plates serve to prevent the hay passing beneath the tooth-bars and the platform-slats, thereby choking the device and stopping the operation of the same.

To the upper sides of the bars I, at a suitable distance from the lower ends thereof, are secured a pair of bearing-blocks, S, in which is journaled a transverse shaft, T, the said shaft being provided with a series of cranks, U, which cranks are arranged under the spaces between the platform-slats P, and extend from the shaft so as to form right angles with each other successively, as shown.

V represents a pair of bearing-blocks, which are secured on the upper sides of side bars I, near the upper ends thereof, and in the said blocks is journaled a transverse shaft, W, which is arranged with cranks that are similar to those with which the shaft T is provided.

X represents a series of bars which are pivoted to the raised portions of the cranks of shafts T and W, the said bars being arranged in the spaces between the platform-slats P and having teeth Y projecting from their upper sides.

From the foregoing description it will be readily understood that when the crank-shafts are rotated the toothed bars X will be caused to move upward, downward, forward, and back alternately, so that some of the said bars will at all times be moving upward with their teeth projecting beyond the faces of the platform-slats, and thereby serve to move the hay or grain upward on the said platform-slats, as will be readly understood.

On one end of the shaft T is secured a sprocket-wheel, Z, which is connected to the sprocket-wheel D by means of an endless chain, A', whereby the rotation of the wheel C, when the machine is in motion, will be imparted to the crank-shafts, and thereby cause the toothed conveying-bars to be operated, as before described.

B' represents a pair of eyebolts which project from the front sides of the bars I at a suitable distance from the upper ends thereof, and C' represents a similar pair of eyebolts which project from the front sides of the said bars near their lower ends. A bail, D', has the rear ends of its diverging arms engaged with the eyebolts B', the front ends of the said bail being provided with a downward-extending hook, E', which is adapted to engage the rear axle of a hay-wagon, as shown in Fig. 1, so as to couple the hay rake and loader and cause the inclined platform and elevator of the rake and loader to project upward and over the rear end of the wagon-body. Brace-rods F' connect the bail with the eyebolts C' and stiffen the connection of the bail to the frame.

The operation of our invention is as follows: When the machine is being drawn across the field in rear of the hay-wagon, the rake-teeth serve to rake the hay from the ground and feed the same to the lower ends of the toothed bars X, the said bars being provided at their lower ends with projecting prongs G', which extend rearward toward the rake-teeth. The function of the guard-plates at the upper and lower ends of the platform-slats is to prevent the hay from working under the said slats, and thereby clogging the machinery.

Having thus described our invention, we claim—

1. In a hay rake and loader, the combination of the axle, the rake-teeth secured thereto, the arms H, secured to the axle and projecting upward therefrom, the side bars I, secured to said arms H, the guide-bars L, secured to the under sides of said side bars and having the open-ended slots M in their upper edges, the platform-slats secured upon the guide-bars between said slots, the crank-shafts arranged below the platform-slats with their cranked portions between the same, the tooth-bars mounted on the cranked portions of the said shafts, the cross-bars K, secured to the ends of the side bars I, and the guard-plates R at the upper and lower ends of the device, having their opposite ends secured, respectively, to the under sides of the cross-bars K and the upper sides of the platform-slats at the ends thereof, substantially as specified.

2. The combination of the axle, the teeth secured thereto, the arms H, secured thereto and projecting upward therefrom, the side bars I, secured to the arms H, the side bars N, arranged above the side bars I, and secured thereto by the standards O, the guide-bars L, secured to the under sides of the side bars I, and having open-ended slots M in their upper edges, the platform-slats secured upon said guide-bars between said slots, the bearing-blocks S V, secured upon the upper edges of the side bars I, the crank-shafts journaled in said bearing-blocks and arranged below the platform-slats, the tooth-bars mounted on the crank-shafts and working in the slots M of the guide-bars, and the guard-plates R, secured to the cross-bars K and the platform-slats, substantially as specified.

In testimony that we claim the foregoing as our own we have hereto affixed our signatures in presence of two witnesses.

FRANK STRUB.
WILLIAM NENDEL.

Witnesses:
  GEO. M. SMITH,
  N. B. KAISER.